US006359662B1

(12) United States Patent
Walker

(10) Patent No.: US 6,359,662 B1
(45) Date of Patent: Mar. 19, 2002

(54) METHOD AND SYSTEM FOR COMPENSATING FOR DEFECTS IN A MULTI-LIGHT VALVE DISPLAY SYSTEM

(75) Inventor: Richard C. Walker, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/435,094

(22) Filed: Nov. 5, 1999

(51) Int. Cl.[7] .............................. H04N 5/74; H04N 9/02

(52) U.S. Cl. ........................ 348/743; 348/615; 348/750; 348/758

(58) Field of Search ................................ 348/750, 758, 348/742, 743, 754, 615, 616, 617; H04N 5/74, 9/02

(56) References Cited

U.S. PATENT DOCUMENTS

| | | | | | |
|---|---|---|---|---|---|
| 4,967,264 | A | * | 10/1990 | Parulski et al. | 358/44 |
| 5,410,365 | A | * | 4/1995 | Nakamura et al. | 348/615 |
| 5,416,516 | A | * | 5/1995 | Kameyama et al. | 348/616 |
| 5,440,352 | A | * | 8/1995 | Deter et al. | 348/750 |
| 5,517,340 | A | * | 5/1996 | Doany et al. | 348/743 |
| 5,612,753 | A | * | 3/1997 | Poradish et al. | 348/743 |
| 5,650,832 | A | * | 7/1997 | Poradish et al. | 348/743 |
| 5,654,775 | A | * | 8/1997 | Brennesholtz | 348/742 |
| 5,704,700 | A | * | 1/1998 | Kappel et al. | 348/771 |
| 5,729,245 | A | * | 3/1998 | Gove et al. | 348/755 |
| 5,784,038 | A | * | 7/1998 | Irwin | 348/743 |
| 5,802,222 | A | * | 9/1998 | Rasch et al. | 385/1 |
| 5,805,216 | A | * | 9/1998 | Tabei et al. | 348/615 |
| 5,805,243 | A | * | 9/1998 | Hatano et al. | 349/5 |
| 5,822,025 | A | * | 10/1998 | Borei et al. | 349/5 |
| 5,905,545 | A | * | 5/1999 | Poradish et al. | 348/743 |
| 5,917,558 | A | * | 6/1999 | Stanton | 348/743 |
| 5,921,650 | A | * | 7/1999 | Doany et al. | 348/743 |
| 6,002,452 | A | * | 12/1999 | Morgan | 348/743 |
| 6,020,940 | A | * | 2/2000 | Ishiwaka et al. | 349/8 |
| 6,028,628 | A | * | 2/2000 | Van Der Valk | 348/616 |
| 6,031,618 | A | * | 2/2000 | Wang | 356/419 |
| 6,084,235 | A | * | 7/2000 | Breithaupt et al. | 348/743 |

* cited by examiner

*Primary Examiner*—Michael Lee
*Assistant Examiner*—Brian P. Yenke

(57) ABSTRACT

A method and system for compensating for defects in a multi-light valve display allows for the compensation of defective pixels in a display. By sequentially illuminating all light valves in a multi-light valve system with all colors, or wavelengths, available in the display, each light valve modulates the full gamut of colors available in the system. In this manner, the remaining light valves can compensate for a defective pixel in one of the light valves. The invention also includes an active compensation feature, whereby defective pixels in the display are identified and are compensated for by an associated display driver.

16 Claims, 2 Drawing Sheets

METHOD AND SYSTEM FOR COMPENSATING FOR DEFECTS IN A MULTI-LIGHT VALVE DISPLAY SYSTEM

TECHNICAL FIELD

The present invention relates generally to display systems, and, more particularly, to a method and system for compensating for defects in a multi-light valve display.

BACKGROUND OF THE INVENTION

Display systems are used in many applications including graphics applications, video projectors, etc. These display systems typically use an integrated light valve to supply a number of colors, typically red, green and blue, to a display device that includes an array of display pixels. The color of each display pixel is determined by the logic that drives the light valve with the result that a coherent picture is displayed on the display device. A light valve may be visualized as an array of pixels.

When using a single light valve to project white light, "stuck" pixels create permanently black or white spots on the projected image. A stuck pixel refers to a defective pixel that is frozen either in the on state or the off state. A pixel that is stuck in its off state appears black, while a pixel that is stuck in its on state appears at the illumination color at full intensity. When a light valve is illuminated with a color, for example red, a pixel stuck on will appear full intensity of the illuminating color (i.e., red) and a pixel stuck off will appear black. At current fabrication yields, it is typical for displays to have one or more stuck pixels.

To achieve a full-color display with a single light-valve, it is common to use a sequential color technique in which three separate images are displayed for each full-color frame: one for red, blue, and green sub-images. However, when a sequential display is used to project a large image, the quick "saccadic", or sporadic, motions of the eye can cause the viewer to see color banding artifacts. This effect results from the color fields being mis-aligned on the moving retina.

To eliminate these sequential color artifacts, it is common for large displays to use multiple light-valves. If red, green and blue images are simultaneously projected from three different light-valves, color artifacts caused by rapid eye movements will be substantially eliminated. The following Table 1 illustrates the timing schedule that a conventional multi-light valve display would follow.

TABLE 1

| Frame #: | Light Valve 1 | Light Valve 2 | Light Valve 3 | Color: |
|---|---|---|---|---|
| 1 | r1 | g1 | b1 | r1 + g1 + b1 |
| 2 | r2 | g2 | b2 | r2 + g2 + b2 |
| 3 | r3 | g3 | b3 | r3 + g3 + b3 |
| . . . | | | | |
| N | rN | gN | bN | rN + gN + bN |

In such a system, light from each pixel of the light valve is used to illuminate a corresponding pixel of the display, so that each display pixel receives light from a corresponding pixel in each light valve.

Unfortunately, in such a system, a defect in any one pixel on a particular light valve will degrade the color gamut available at the display pixel corresponding to the failed light valve pixel. This causes a color shift in the display pixel. For example, a failed-off pixel in light valve 1, the red light valve, will limit the color of the corresponding display pixel to lie somewhere between green and blue, and will prevent the corresponding display pixel from displaying any red component.

Therefore, it would be desirable to have a multi-light valve display that allows compensation for a failed pixel in one or more of the light valves.

SUMMARY OF THE INVENTION

The invention provides a method and system for compensating for defects in a multi-light valve display.

The present invention may be conceptualized as a method for operating a display including light valves, each light valve including pixels. The method comprises the steps of controlling, during a time period, light of a first color by a first light valve and light of a second color by a second light valve in the display; and shifting, in a subsequent time period, the light of the first color and the light of the second color such that the light of the second color is controlled by the first light valve and the light of the first color is controlled by the second light valve.

In architecture, the invention is a system for operating a display including light valves, each light valve including pixels. The system comprises a first light source for supplying a light of a first color, a second light source for supplying a light of a second color, a first light valve and a second light valve. The system also includes an illumination schedule that defines the illumination of the light valves so that, during a time period, the light of the first color illuminates the first light valve and the light of the second color illuminates the second light valve. In a subsequent time period, the light of the first color and the light of said second color are shifted such that the light of the second color illuminates the first light valve and the light of the first color illuminates the second light valve.

The invention has numerous advantages, a few of which are delineated, hereafter, as merely examples.

An advantage of the invention is that it reduces or eliminates eye motion artifacts in a display.

Another advantage of the invention is that it reduces the chromatic error caused by a failed pixel in a light valve array.

Another advantage of the invention is that it allows a user of the display to identify to the display logic the location of a defective pixel.

Another advantage of the invention is that it allows the display logic to compensate for a defective pixel in one or more light valves.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

For purposes of the following description, a light valve controls the transfer of light from a light source to a display. Typically, the light transfer from the light source to the display involves transmission or reflection of the light by the light valve. In response to a control signal, the light valve controls the intensity of the light transferred to the display, and, hence, the apparent brightness of the display, to a value in the range from zero to a maximum. The maximum is determined mainly by the intensity of the light source.

To enable the display to display an image, the light valve is divided into light valve pixels arranged in a square or rectangular array, for example, an array of 640 by 480 pixels. In such a light valve, each light valve pixel controls the transfer of light from the light source to a corresponding display pixel of the display. In response to a control signal, the light valve pixel controls the intensity of the light transferred to the corresponding display pixel, and, hence, the apparent brightness of the display pixel, to a value in the range from zero to a maximum.

To enable the display to display a color image, the display is illuminated with light of n different colors. Conventionally, colors that combine to form white light, such as red, green and blue, are chosen. The display is illuminated with light of n different colors either by using a single light valve and sequentially illuminating the light valve with light of the n different colors or by using n light valves, each of which is conventionally illuminated with light of one different color. When the light valve is sequentially illuminated, each light valve pixel; and when light valves are simultaneously illuminated, corresponding light valve pixels; control the intensity contribution of each color to the corresponding display pixel.

In a multi-light valve system, the array of pixels constituting one light valve is illuminated with light of a single color and the modulated light is projected onto a screen in alignment with and overlapping the light modulated by a plurality of other monochromatic light valves. In a three light valve system, the visible display includes display pixels, each of which is illuminated with light from each light valve, resulting in an image having the desired color.

The array of pixels comprising the display is the overlapped superposition of the pixel arrays from each of the light valves. Therefore, each pixel in the display is illuminated by a corresponding pixel in each light valve.

Figure 1:
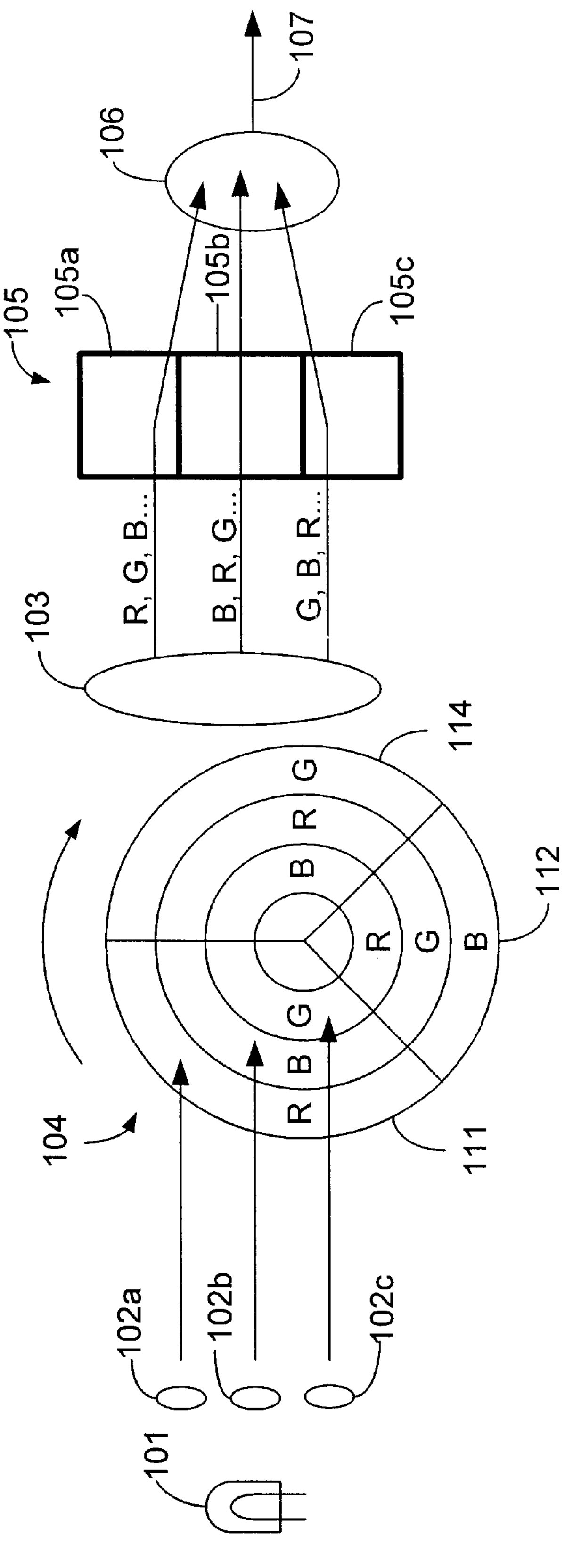
FIG. 1 is a schematic view illustrating a light valve system constructed in accordance with the invention.

Turning to the drawings, FIG. 1 is a schematic view illustrating a light valve system 100 constructed in accordance with the invention. Light valve system 100 includes light source 101, which illuminates rotating color filter 104. Light source 101 projects its light through light diffusers 102*a*, 102*b* and 102*c*, respectively, to illuminate the portions 111, 112 and 114 of rotating color filter 104. Each portion 111, 112 and 114 of rotating color filter 104 includes three color regions, red (R), green (G) and blue (B) arranged in a different radial order. The color regions in each portion of the rotating color filter 104 are arranged such that each portion 111, 112 and 114 of the filter 104 includes all three colors, but in a different order. The order of colors is staggered for each light valve such that the display is illuminated with each color during each display frame, or time period. Rotating color filter 104 rotates at the frame rate and cooperates with light source 101 to project light onto light valves 105.

Although shown as a single light source 101, light source 101 may alternatively include multiple pure color sources, in which case light diffusers 102*a*, 102*b* and 102*c* and rotating color filter 104 could be omitted and the pure light sources would directly illuminate the light valves 105 as will be described below. In such an embodiment, each pure light source would sequentially change color to each light valve in the proper sequence so that the light valves would be illuminated with light of a different color. A typical implementation would include three pure light sources per light valve system.

Lens 103 directs the light exiting the rotating color filter 104 onto the appropriate one of light valves 105. The sequential color regions of rotating color filter 104 correspond to each of the three light valves 105*a*, 105*b* and 105*c*. For example, the light exiting the R, G and B regions of portions 111 , 114 and 112, respectively, of rotating color filter 104 are directed by lens 103 to light valve 105*a*. Similarly, the light exiting the B, R and G regions of portions 111, 114 and 112, respectively, of rotating color filter 104 are directed by lens 103 to light valve 105*b*. In similar manner, the light exiting the G, B and R regions of portions 111, 114 and 112, respectively, of rotating color filter 104 are directed by lens 103 to light valve 105*c*.

In accordance with the invention, the rotating color filter 104 illustrates the concept in which each light valve included in light valve system 100 is sequentially illuminated by each of the three colors, red, green, blue, in such a way as to prevent the failure of any one pixel in a light valve to cause a fixed full intensity color or white spot on the display.

While the following description includes reference to a light valve system including three colors, the principles of the invention are applicable to systems having a fewer or greater number of colors.

Still referring to FIG. 1, light source 101 is directed towards rotating color filter 104 such that the light exiting light diffusers 102*a*, 102*b* and 102*c* sequentially impinge upon portions 111, 112 and 114 of rotating color filter 104. In this manner, each of the three light valves 105*a*, 105*b* and 105*c* receive a full gamut of colors from the light source over three frames. Stated another way, all colors sequentially illuminate each light valve over three frames. The order of colors is staggered for each light valve such that the display is illuminated with each color during each display frame, or time period. For example, light valve 105*a* receives light in the order red (R), green (G), and blue (B), while light valve 105*b* receives light in the order B, R, G, and light valve 105*c* receives the three colors of light in the order G, B, R.

All of the colors of light that are controlled by light valves 105*a*, 105*b* and 105*c* are then directed to combiner 106, which combines the individual light from each of the three light valves into a combined output 107. This output is then sent to a display (not shown).

As an alternative to light diffusers 102*a*, 102*b* and 102*c*, any combination of a collimating lens and diffuser may be used to focus the light onto light valves 105. Furthermore, the concepts of the invention may be practiced using any light source that is projected through a transparent light valve, or reflected from a reflective light valve, and imaged onto either a screen or presented to a human eye through a suitable eyepiece.

The following Table 2 illustrates the concept of the invention.

TABLE 2

| Frame #: | Light Valve 1 | Light Valve 2 | Light Valve 3 | Color: |
|---|---|---|---|---|
| 1 | r1 | g1 | b1 | r1 + g1 + b1 |
| 2 | b2 | r2 | g2 | r2 + g2 + b2 |
| 3 | g3 | b3 | r3 | r3 + g3 + b3 |
| 4 | r4 | g4 | b4 | r4 + g4 + b4 |

By operating the light valve system 100 in accordance with the schedule illustrated in Table 2, a given pixel in any light valve can fail, and the full color gamut will remain available in the corresponding display pixel through the remaining operating light valves. For a three light valve system as shown in FIG. 1, a single pixel failed in the off state in one of the light valves can be completely corrected for pixel intensities up to two thirds of full intensity. Similarly, a pixel failed in the off state in two light valves can be compensated for up to one third of full intensity. This is so because, while the full color gamut is still available at each display pixel, the failed light valve pixel diminishes the available light intensity.

Shown below in Table 3 is an example of a situation in which a pixel has failed in the off state with respect to light valve 1.

TABLE 3

| Frame #: | Light Valve 1 | Light Valve 2 | Light Valve 3 | Color: |
|---|---|---|---|---|
| 1 | 0 | g1 | b1 | g1 + b1 |
| 2 | 0 | r2 | g2 | r2 + g2 |
| 3 | 0 | b3 | r3 | r3 + b3 |
| 4 | 0 | g4 | b4 | g4 + b4 |

In the above example shown in Table 3, frame one is deficient in red, frame two is deficient in blue and frame three is deficient in green. However, when pixels are integrated over three frames, such as frame one plus frame two plus frame three, the combination of frames one, two and three includes two samples each of color red, blue and green. At a given pixel intensity, this schedule allows the light valves two and three to create the same color as would a system in which all three light valves are functioning, but at two thirds the given intensity. Although this pixel is less bright than the surrounding pixels, it's less noticeable than if it had a different color as it would were one color component missing.

As illustrated above with respect to Table 3, the invention permutes, or changes the order or arrangement of, the light controlled by the light valves such that each light valve controls each color in the display.

The invention described thus far provides a passive compensation system in that each display pixel is composed of contributions from three different light valves, so that the effect of one defective off pixel in one light valve is diluted to one third of its normal effect by the corresponding pixels of the other two working light valves.

A defective pixel can be defective either in the off state as described above with respect to Table 3, or may be defective in the on state. Pixels defective in the on state can be compensated by reducing the programmed pixel R, G, B values in the other two light valves. This can be accomplished by subtracting one-third intensity white from the desired color value. This correction will exactly correct all colors that have at least one third on value for each R, G and B component.

To further illustrate this passive compensation system, Table 4 below illustrates a situation in which a display pixel, having Rx, Gx, Bx intensity values, is generated over three frames.

TABLE 4

| Frame # | 1 | 2 | 3 |
|---|---|---|---|
| Light Valve 1: | Rx/3 | Gx/3 | Bx/3 |
| Light Valve 2: | Gx/3 | Bx/3 | Rx/3 |
| Light Valve 3: | Bx/3 | Rx/3 | Gx/3 |

As shown in Table 4, the total integrated light value for this time cycle and pixel is:

$3*Rx/3=Rx$ $3*Gx/3=Gx$ $3*Bx/3=Bx.$

Now, if this pixel in light valve 1 is defective in the off position, the situation illustrated Table 5 applies.

TABLE 5

| Frame # | 1 | 2 | 3 |
|---|---|---|---|
| valve1: | 0 | 0 | 0 |
| valve2: | Gx/3 | Bx/3 | Rx/3 |
| valve3: | Bx/3 | Rx/3 | Gx/3 |

The total integrated light value for this time cycle and pixel would be $2*Rx/3$ $2*Gx/3$ $2*Bx/3.$ This illustrates that the subject pixel has the correct color but at a slightly dimmer intensity. This situation is preferable to a color shifted spot in the image, which would be the case in a system in which each light valve controls only a single color. In such a system, a failed red pixel results in a spot in the display having the proper green and blue components, but no red component.

A motion picture is divided into a succession of still images (frames) that are displayed sequentially during successive time intervals. Frame 1 is defined as a still image displayed during the time interval from $T=0$ to $T=\Delta T$, frame 2 is defined as a second image displayed during the time interval from $T=\Delta T$ to $T=2*\Delta T$, and frame N is defined as an Nth image displayed during the time interval from $T=(N-1)*\Delta T$ to $N*\Delta T$.

As mentioned above, the invention described thus far provides a passive compensation system in that by sequentially illuminating each light valve with each color, the visibility of defective pixels may be reduced. In an additional embodiment, the invention includes an active compensation system in which defective pixels in each light valve are indicated and their location communicated to a computer. The computer includes a display driver so that the defective pixels may be actively compensated. This embodiment will be described below.

Figure 2:
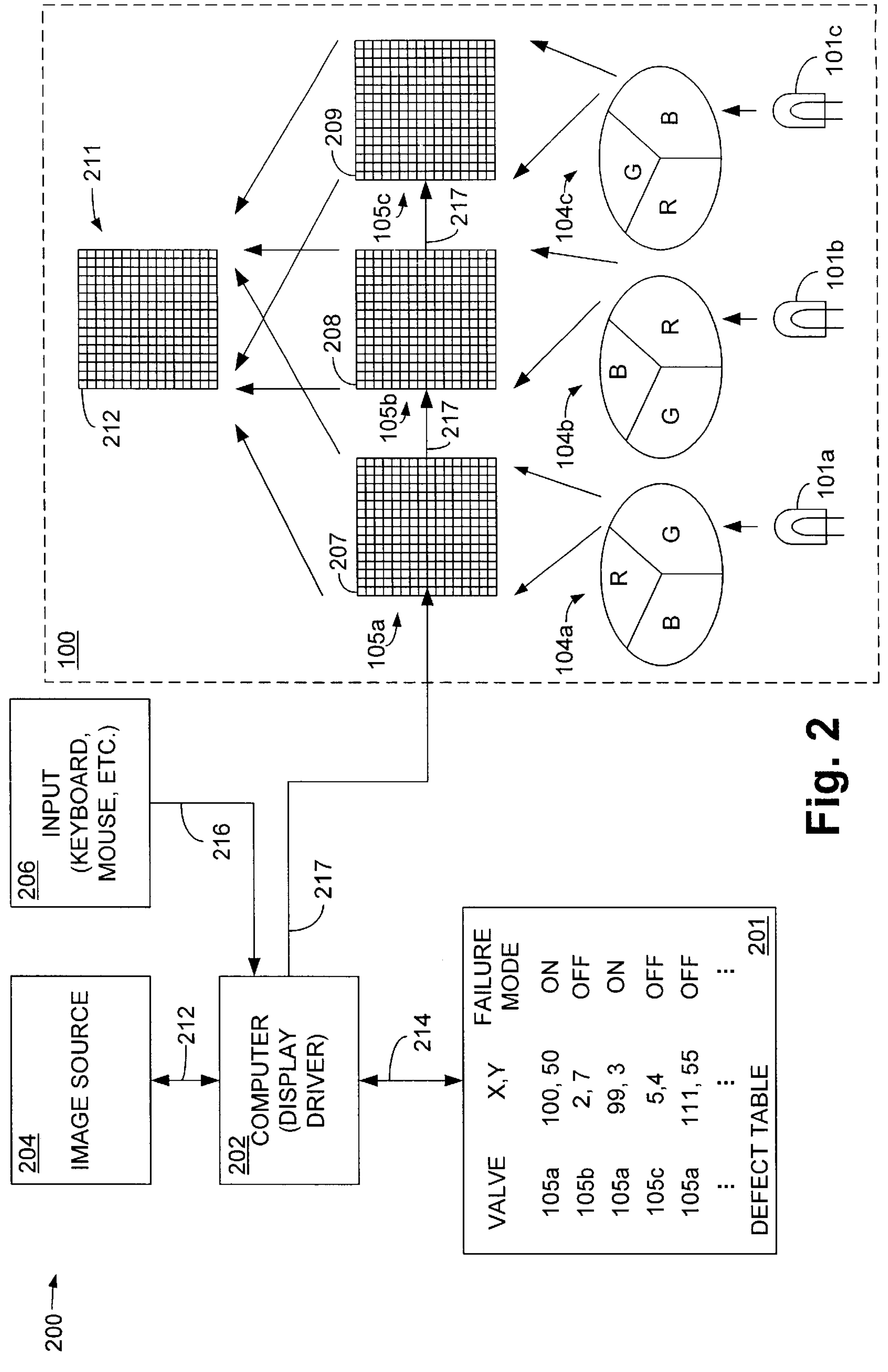
FIG. 2 is a block diagram illustrating the light valve system of FIG. 1 including an active compensation system in accordance with another aspect of the invention.

FIG. 2 is a block diagram illustrating the light valve system 100 of FIG. 1 including an active compensation system. Light valve system 100 includes light sources 101*a*, 101*b* and 101*c*, each supplying light to rotating color filters 104*a*, 104*b* and 104*c*, respectively. The three rotating color filters 104*a*, 104*b* and 104*c* correspond to rotating color filter 104 of FIG. 1. The light generated by light source 101*a* passes through rotating color filter 104*a* and illuminates light valve 105*a*. Light valve 105*a*, while illustrated as a 16×16 array of pixels, can include any number of pixels as appropriate for a display as known to those skilled in the art. Similarly, light valve 105*b* is illuminated by light source 101*b* and light valve 105*c* is illuminated by light source 101*c*.

Pixel 207 of light valve 105*a*, pixel 208 of light valve 105*b* and pixel 209 of light valve 105*c* illustrate the operation of the three light valve system in which one pixel of each light valve corresponds to the same display pixel 212 in display 211. The simultaneous illumination of pixels 207, 208 and 209 in each of the three illustrated light valves combine to illuminate display pixel 212 with light from the pixels 207, 208 and 209 of the light valves 105*a*, 105*b* and 105*c*, respectively. In this manner, display pixel 212 includes the light from pixels 207, 208 and 209 in an overlapped superposition arrangement. Therefore, each pixel in the display is illuminated by a corresponding pixel in each light valve.

As mentioned above with respect to FIG. 1, if pixel 207 fails, for example in the off state, the red, green and blue light available from each of the light valve pixels 208 and 209 allows display pixel 212 to display a full color gamut (in this case any combination of red, green and blue), albeit at an illumination intensity reduced by ⅓.

In accordance with the active compensation aspect of the invention, light valve system 100 receives commands from computer 202 over connection 217. The system illustrated in FIG. 2 allows a user of the display 211 to indicate a defective pixel in the display 211. Computer 202 includes a display driver as known to those skilled in the art. Image source 204 provides a source image to computer 202 and can include read only memory (ROM), random access memory (RAM), digital video disk (DVD) input, conventional television, high definition television (HDTV), a computer image, a camera, or any other image source that is capable of being input to computer 202.

An input device 206 communicates with computer 202 via connection 216. Input device 206 can be for example a keyboard, a mouse, or any other mechanism for interfacing with a computer display. Input 206 is essentially a user interface, which allows a person viewing a display having defective pixels to indicate and enter those pixels that are defective into a defect table 201. Defect table 201 is linked to computer 202 via connection 214. Alternatively, defective pixels may be automatically detected and their location communicated to the computer 202.

The use of the active compensation feature will now be described. A person using a display indicates one or more failed pixels in the display through the use of a mouse, a keyboard or any other input device. The indication of defective pixels is accomplished by computer 202 sending a test pattern or video data, received from image source 204, over connection 217 to each light valve 105*a*, 105*b* and 105*c*. Alternatively, the test pattern may also be a uniform image field at a reduced intensity. A test pattern at full intensity is particularly useful for identifying pixels that are stuck in the off state, while a test pattern having zero intensity is particularly useful for identifying pixels that are stuck in the on state. Preferably, a test pattern having an intensity between zero and full will be useful for identifying pixels that are stuck in either state. Each light valve is used to illuminate the display with the test pattern or video data such that the user of the display views the illuminated display to indicate defective pixels for each light valve. The test pattern should be used to illuminate the display through one light valve at a time, sequentially illuminating all light valves, so that defective pixels can be isolated to a particular light valve.

In this manner, defective pixels in each light valve may be identified. A user views the display 211, which, for example, includes illumination solely from light valve 105*a*, and using a mouse, points to any defective pixels, thereby indicating the x, y location of a defective pixel in the display. The location of the indicated defective pixel is then placed in defect table 201. For example, a defective pixel in light valve 105*a* located at x, y location 100, 50 is indicated as being failed in the on state. Similarly a pixel located at x, y position 2, 7 in light valve 105*b* is indicated as being failed in the off state. In this manner, a user can inspect each light valve 105*a*, 105*b* and 105*c* for defective pixels and indicate those defective pixels to the computer 202 for placement in defect table 201. Any color may be used to illuminate the display during the foregoing test. However, the color green has been found to offer the highest sensitivity to the human eye.

The information regarding defective pixel locations contained in defect table 201 allows the display driver located in computer 202 to actively compensate for known defective pixels. For example if it is known that a given pixel in light valve 105*a* is defective in the off position, then corrected values can be displayed as illustrated in Table 6.

TABLE 6

| Frame # | 1 | 2 | 3 |
|---|---|---|---|
| Light Valve 1: | 0 | 0 | 0 |
| Light Valve 2: | Gx/2 | Bx/2 | Rx/2 |
| Light Valve 3: | Bx/2 | Rx/2 | Gx/2 |

In this manner an integrated value Rx, Gx, Bx, which is exactly correct in color but at a reduced intensity, is displayed at this pixel location.

It should be understood that although illustrated using three colors and a rotating color filter in which the red, green and blue color filters are sequentially rotated in a particular direction, the concepts of the invention will work equally well with a greater or lesser number of colors, and in situations in which the colors might be permuted in directions opposite that described above. Furthermore, the invention is applicable to systems in which light valves are illuminated directly by color sources that are capable of sequentially changing color without using a rotating color filter. Furthermore, the concept of the invention is applicable to any imaging application that uses multiple colors or wavelengths of electromagnetic energy. For example, the invention is applicable to systems as described above in which visible light is presented to a viewer and is applicable to photo-lithographic systems in which a photoresist is exposed using different colors of ultraviolet light. Any imaging application using visible and/or non-visible light can benefit from the concepts of the invention.

It will be apparent to those skilled in the art that many modifications and variations may be made to the preferred embodiments of the present invention, as set forth above, without departing substantially from the principles of the present invention. For example, systems having greater or fewer numbers of colors or wavelengths can benefit from the concepts of the invention. Furthermore, the passive and active compensation schemes disclosed above may be implemented individually or in cooperation. All such modifications and variations are intended to be included herein within the scope of the present invention, as defined in the claims that follow.

What is claimed is:

1. A method for operating a display including light valves, each light valve including pixels, the method comprising the steps of:

controlling, during a time period, light of a first color by a first light valve and light of a second color by a second light valve in said display;

shifting, in a subsequent time period, said light of said first color and said light of said second color such that said light of said second color is controlled by said first light valve and said light of said first color is controlled by said second light valve; and modifying an output of a first pixel associated with said first light valve to compensate for a defective second pixel associated with said second light valve, said first pixel corresponding to said defective second pixel in said display.

2. The method of claim 1, further comprising the step of:

controlling a light of a third color in said time period, such that said light of said first color, said light of said second color and said light of said third color are shifted such that said light of said first color is controlled by said second light valve, said light of said second color is controlled by a third light valve and said light of a third color is controlled by said first light valve.

3. The method of claim 1, wherein over a plurality of said time periods said light of said first color and said light of said second color are each controlled by each of said first light valve and said second light valve.

4. The method of claim 1, further comprising the step of identifying a defective pixel in said display.

5. The method of claim 4, wherein said defective pixel is associated with one of said plurality of light valves.

6. The method of claim 5, further comprising the step of compensating for said defective pixel using a remaining light valve.

7. The method of claim 4, wherein said defective pixel is failed in the off state.

8. The method of claim 4, wherein said defective pixel is failed in the on state.

9. A system for operating a display, the display including light valves, each light valve including pixels, the system comprising:

a first light source for supplying a light of a first color and a second light source for supplying a light of a second color;

a first light valve and a second light valve;

means for illuminating, during a time period, said first light valve with said light of said first color and said second light valve with said light of said second color, wherein in a subsequent time period, said light of said first color and said light of said second color are shifted such that said light of said second color illuminates said first light valve and said light of said first color illuminates said second light valve; and means for modifying an output of a first pixel associated with said first light valve to compensate for a defective second pixel associated with said second light valve, said first pixel corresponding to said defective second pixel in said display.

10. The system of claim 9, further comprising:

means for controlling a light of a third color in said time period, such that said light of said first color, said light of said second color and said light of said third color are shifted such that said light of said first color illuminates said second light valve, said light of said second color illuminates a third light valve and said light of said third color illuminates said first light valve.

11. The system of claim 9, wherein over a plurality of said time periods said light of said first color and said light of said second color each illuminate each of said first light valve and said second light valve.

12. The system of claim 9, further comprising:

a computer in communication with said illuminating means; and a device configured to identify and communicate to said computer the location of a defective pixel in said display.

13. The system of claim 12, wherein said defective pixel is associated with one of said light valves.

14. The system of claim 13, further comprising means for compensating for said defective pixel using a remaining light valve.

15. The system of claim 12, wherein said defective pixel is failed in the off state.

16. The system of claim 12, wherein said defective pixel is failed in the on state.

* * * * *